United States Patent [19]

Williams

[11] Patent Number: 4,531,589
[45] Date of Patent: Jul. 30, 1985

[54] RETRACTABLE TILLER FOR INSTALLATION AT SIDE OF TRACTOR

[76] Inventor: Abbott R. Williams, 1195 Cuttings Wharf Rd., Napa, Calif. 94558

[21] Appl. No.: 466,547

[22] Filed: Feb. 15, 1983

[51] Int. Cl.³ .............................................. A01B 13/04
[52] U.S. Cl. ........................................ 172/5; 172/38; 172/99
[58] Field of Search .................... 172/2, 4.5, 5, 6, 7, 172/9, 38, 39, 81, 98, 99, 111, 233, 234, 235, 517, 523, 547, 117, 260.5, 812

[56] References Cited

U.S. PATENT DOCUMENTS

| | | | |
|---|---|---|---|
| 2,108,078 | 2/1938 | Russell | 172/39 |
| 2,393,190 | 1/1946 | Ritenour | 172/523 X |
| 2,442,095 | 5/1948 | Reed et al. | 172/5 |
| 2,749,824 | 6/1956 | Friday | 172/5 |
| 2,791,953 | 5/1957 | Erickson et al. | 172/98 |
| 3,117,632 | 1/1964 | Caggiano, Jr. | 172/5 |
| 3,190,364 | 6/1965 | Maloney | 172/111 |
| 3,750,757 | 8/1973 | Saetti | 172/9 |
| 3,788,401 | 1/1974 | Scheidt et al. | 172/812 |
| 4,141,419 | 2/1979 | Buchele et al. | 172/7 X |
| 4,166,506 | 9/1979 | Tezuke et al. | 172/4.5 |
| 4,266,617 | 5/1981 | Mullet et al. | 172/117 X |
| 4,287,955 | 9/1981 | Anderson | 172/98 |
| 4,332,299 | 6/1982 | Parks et al. | 172/98 |

FOREIGN PATENT DOCUMENTS

| | | | |
|---|---|---|---|
| 1043030 | 6/1953 | France | 172/39 |
| 6807548 | 12/1969 | Netherlands | 172/39 |

*Primary Examiner*—Richard T. Stouffer
*Attorney, Agent, or Firm*—Owen, Wickersham & Erickson

[57] ABSTRACT

A tiller for installation at one side of a tractor, having a retractable tiller frame movable by a power mechanism which is normally actuated by a horizontal sensor arm through a linkage system. Here, there is manual override enabling the tractor driver to actuate the power mechanism regardless of the position of the sensor arm. There is also a manual disengagement member to place operation of the actuator entirely under manual control. Also, the tiller frame carries a rotary head having a series of depending tines, and a sharp cutting blade depends from the tiller frame closely adjacent to the head for cutting off weeds that tend to wind around the tines. The power mechanism preferably comprises hydraulic structure for holding the tines down in the soil at a predetermined vertical position, while a manually controlled valve when actuated, enables a predetermined obstacle force to push the head upwardly.

13 Claims, 11 Drawing Figures

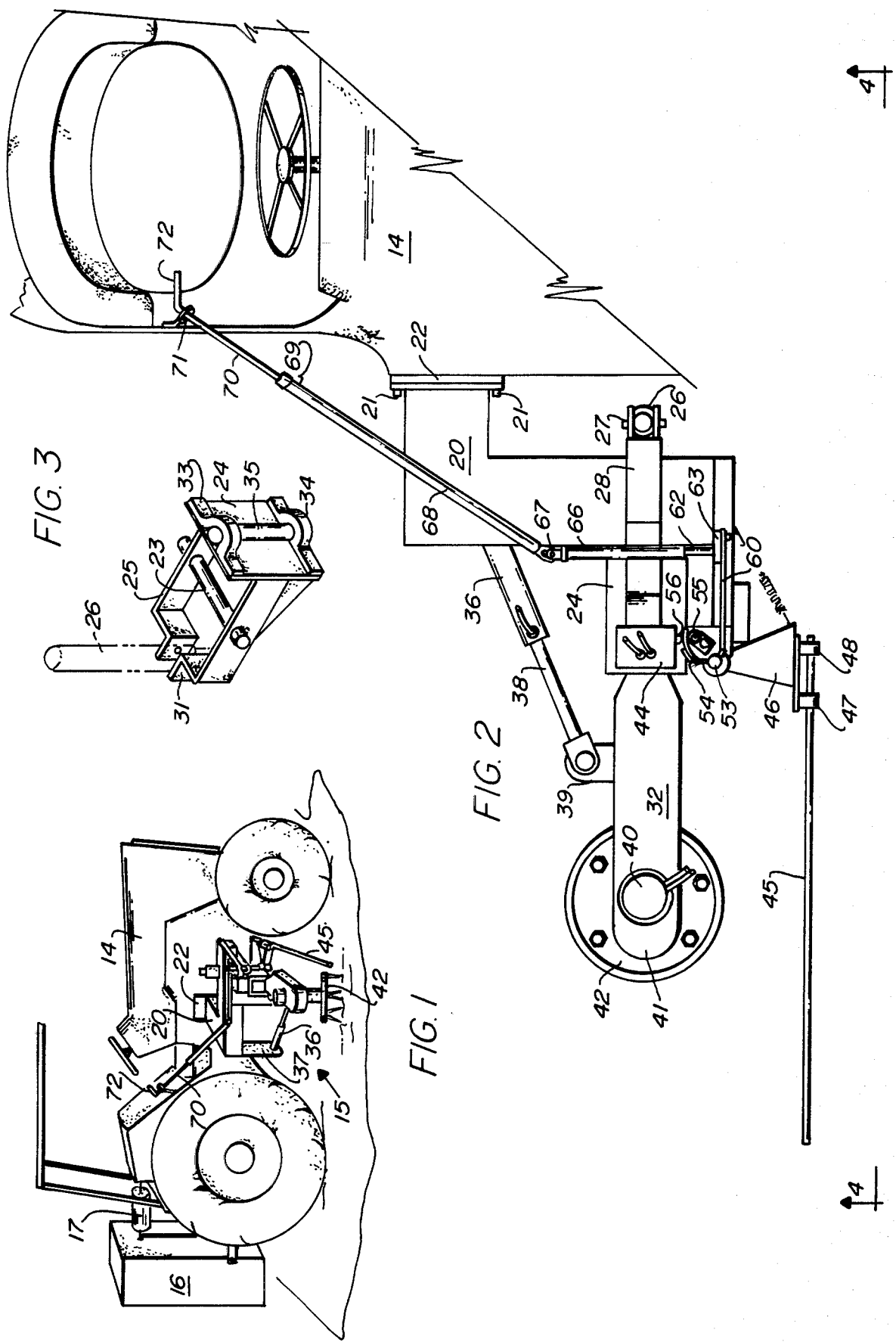

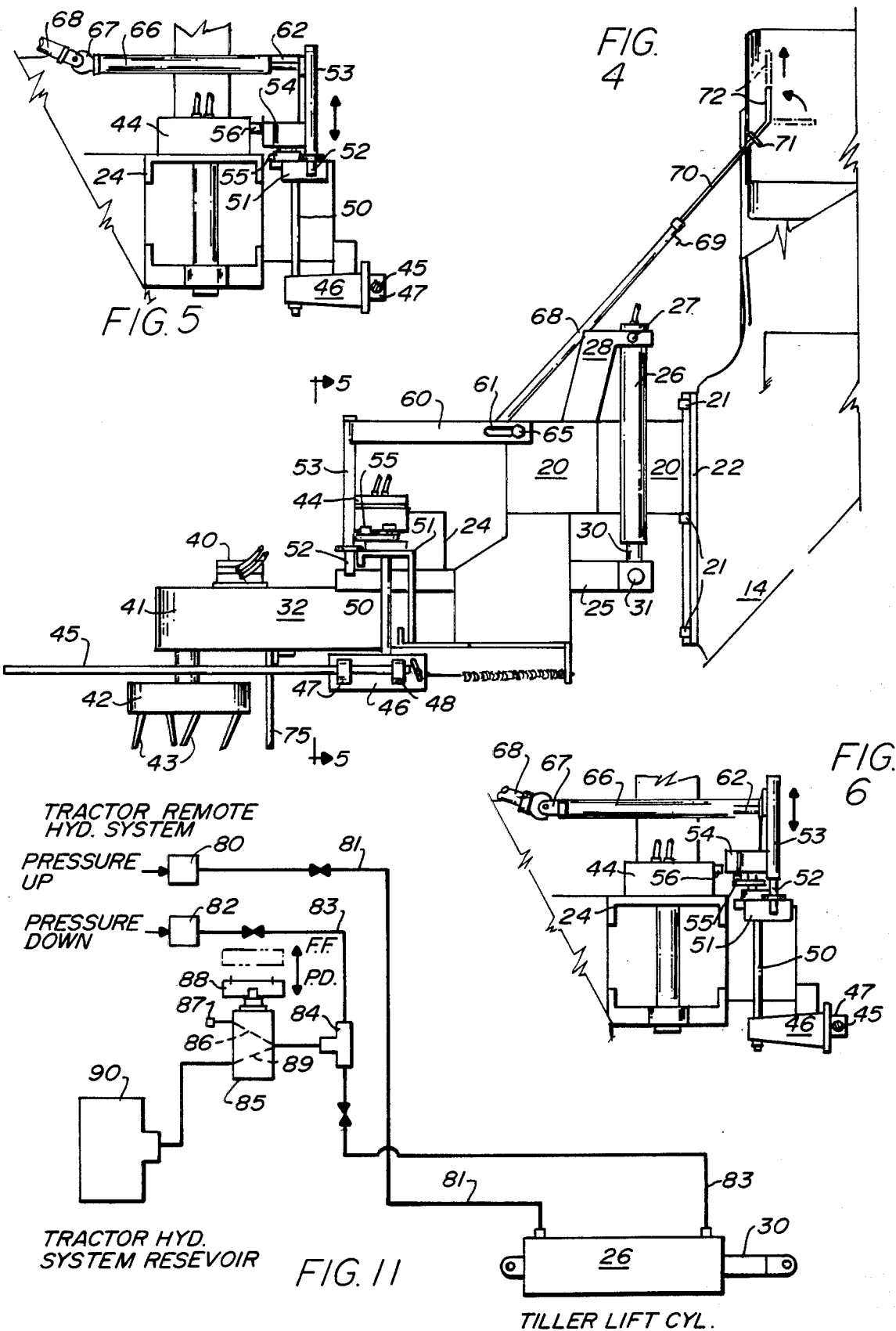

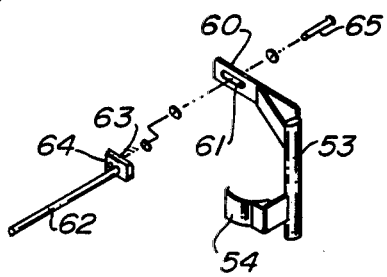
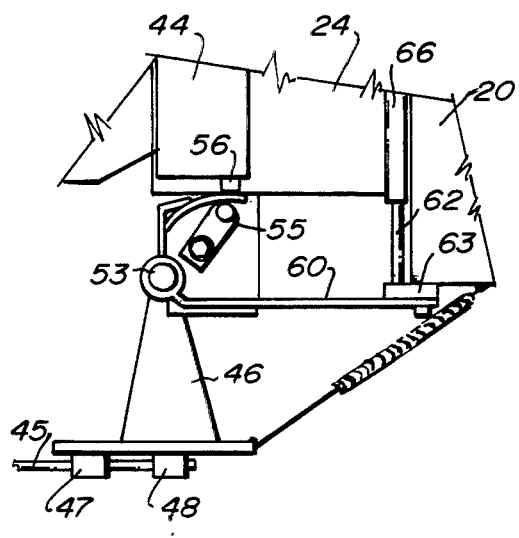
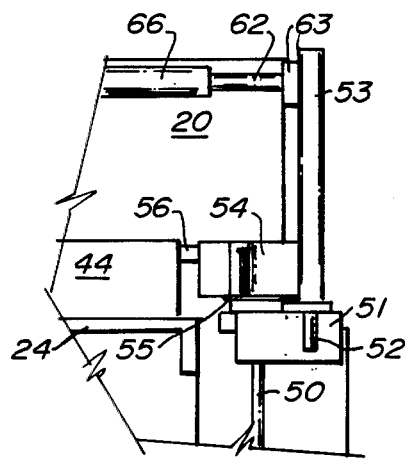
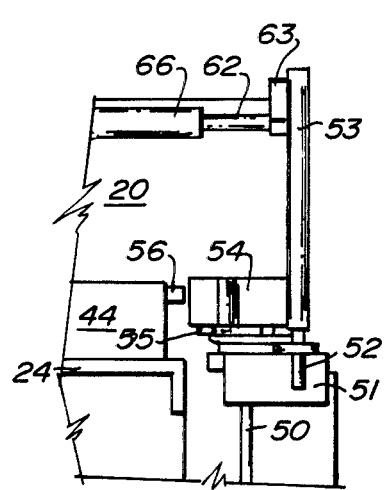

RETRACTABLE TILLER FOR INSTALLATION AT SIDE OF TRACTOR

This invention relates to a vineyard or orchard plow. It is an improvement over the plow described and claimed in my co-pending earlier-filed application Ser. No. 281,419, filed July 8, 1981, now U.S. Pat. No. 4,384,618 issued May 24, 1983.

BACKGROUND OF THE INVENTION

My earlier invention provided for automatic retraction of a tiller head when a sensor engages a tree trunk, grape stake, or similar thing. I have now found that at times manual control is preferable or even necessary.

One place where automatic by the sensor is inadequate is where one encounters parts of an irrigation system, such as water pipes and risers. The sensor is usually not set to be actuated by such elements; so a manual override by the operator is essential. Another example is that, in hilly terrain, a sensor set properly for the level ground is not properly set for a hillside, where the stakes etc. extend up vertically, not perpendicularly to the ground surface. Going uphill, the sensor will then actuate the retraction too late.

There are also occasions when the sensor is actuated by things that do not actually call for retraction of the tiller,—such as in the spring when mere weeds may actuate the sensor although the tiller should not be retracted. There, disengagement of the sensor is desirable, and manual operation of the retracting mechanism is necessary.

Hence, the present invention enables both manual and automatic operation, with rapid changeover from one to the other.

Another problem has been that in some vineyards or orchards and at certain seasons, grass stems have wound around the tiller tines and have tended to whip against young vine stems. The present invention also addresses this problem and provides means for cutting off such grass stems.

A third problem has been that the tiller tines have heretofore been held down underground during tilling with force that prevents their rising, but at times these tines have, as a result, run into large rocks that tended to damage the tines. This problem is also addressed by the present invention, which enables the operator to place the tines in a free-floating operation when that is desirable.

SUMMARY OF THE INVENTION

The invention comprises a retractable tiller for installation at one or both sides of a tractor. Like the unit of Ser. No. 281,419, the tiller has a stationary frame adapted to be secured to the frame of the tractor. This frame supports a gimbal having a gimbal frame pivoted to the stationary frame by a stationary horizontal pivot bar; the gimbal also has first and second vertical pivot bars or rods.

A double-acting vertical hydraulic apparatus has its cylinder secured to the stationary frame and a piston rod secured to the gimbal frame, so that it can tilt the gimbal frame about the horizontal pivot bar. A tiller frame is pivoted to the first vertical pivot bar and carries the tilling apparatus, so that a double-acting horizontal hydraulic apparatus having a cylinder secured to the stationary frame and a piston rod secured to the tiller frame can swing the tiller frame about the first vertical pivot bar.

A control valve for the horizontal hydraulic apparatus is mounted on the tiller frame and has an actuating lever. A sensor arm extends out horizontally from the gimbal frame. During automatic operation, when the sensor arm engages a vine trunk, tree trunk, grape-stake, fence post or the like it rotates a cam which actuates the valve to retract the tiller frame and thereby protect the vine trunk.

All of this, so far, is substantially as in Ser. No. 281,419. However, by a novel linkage provided in the present invention, the operator is enabled to move the pertinent elements into a position where automatic operation is manually overridden or disengaged in favor of manual operation.

The sensor arm is connected to a vertical pivot rod via a bracket, while another vertical rod is secured to that bracket, parallel to and offset from the vertical pivot rod. A sleeve around an upper portion of the offset vertical rod is slidable and rotatable relative thereto, and this sleeve has thereon a cam for engaging the actuating control lever which actuates the control valve. Cam actuating means, offset-mounted on the vertical pivot rod, is normally in contacted with a lower portion of cam, to cause the cam to bear against and actuate the actuating lever when the sensor arm swings.

The present invention provides manual override means for rotating the sleeve so as to cause its cam to actuate the actuating lever regardless of the position of the sensor arm, and it provides manual disengagement means for raising the sleeve upwardly relatively to the offset vertical rod to disengage the cam from the cam actuating means, so as to place operation of the actuating lever entirely under manual control.

The manual override means and manual disengagement means preferably comprise a handle within easy reach of the tractor operator, mounted on a downwardly extending rod, and a horizontally extending rod connected to the downwardly extending rod by a ball joint and connected to the sleeve in a manner converting rotary movement of the horizontally extending rod to vertical movement of the sleeve and converting translation of the horizontally extending rod to rotation of the sleeve, bringing the cam toward or away from the actuating lever.

The tilling apparatus includes a rotary head supported by the tiller frame at its distal end, and this head has a series of depending tines. The present invention adds to this a sharp cutting blade depending from the tiller frame closely adjacent to the tiller head for cutting off weeds that tend to wind around the tines.

Power means for controlling the vertical position of the tiller head includes, in this invention, hydraulic means for holding the tiller tines down in the soil at a predetermined vertical position and a manually controlled valve which, when actuated, lets a predetermined obstacle force push the tiller head upwardly.

BRIEF DESCRIPTION OF THE DRAWINGS

FIG. 1 is a side view in perspective of a tractor having a side-mounted tiller embodying the principles of the invention.

FIG. 2 is an enlarged fragmentary top plan view of the tiller of FIG. 1 and its attachment to one side of the tractor.

FIG. 3 is an isometric view of the gimbal employed in the tiller, the vertical hydraulic device being indicated in broken lines.

FIG. 4 is a view in front elevation of the tiller and related parts of FIG. 2, as viewed along the line 4—4 in FIG. 2.

FIG. 5 is a fragmentary view in section taken along the line 5—5 in FIG. 4, with the cam in its normal, automatic actuation position.

FIG. 6 is a view like FIG. 5 with the cam raised to its manual-operation position.

FIG. 7 is an exploded fragmentary view of a portion of the system linking the control handle to the valve actuating cam.

FIG. 8 is a fragmentary enlarged plan view of the apparatus portions related to the valve actuating cam.

FIG. 9 is an enlarged view in elevation of a portion of FIG. 5.

FIG. 10 is a similar view of a portion of FIG. 6.

FIG. 11 is a diagram of an hydraulic circuit used for moving the tiller head up and down.

DESCRIPTION OF A PREFERRED EMBODIMENT

FIG. 1 shows a tractor 14, to one side of which is secured a tiller 15 embodying the principles of this invention. A large reservoir 16 for hydraulic fluid is supported at the rear of the tractor 14. Connected to the reservoir 16 is a hydraulic pump 17 connected to and driven by a power take-off shaft of the tractor 14, as explained in my earlier application Ser. No. 281,419, filed July 8, 1981. The pump 17 supplements the standard tractor pump and feeds a hydraulic motor and other hydraulic apparatus, as will be explained. The reservoir 16 and the pump 17 are needed because of the large flow of fluid required by the invention. The reservoir 16 can be relatively small for a closed-end pump 17 operated only on demand.

As shown in FIGS. 2 and 3, a stationary frame 20 is secured, preferably by bolts 21 so that it is removable, to a side frame bracket 22 on either side of the standard farm tractor 14. The frame member 20 supports a horizontal pivot rod 23, which in turn supports or is part of a gimbal (see FIG. 3) having a frame 24 and including a pivotally mounted support member 25 that carries the gimbal frame 24. As shown in FIG. 4, a vertically mounted double-acting hydraulic cylinder 26 is secured at its upper end 27 to an upwardly extending arm 28 of the stationary frame member 20, and a piston rod 30 extends out from the cylinder 26 and is secured to an inboard end portion 31 of the support member 25 that carries the gimbal frame 24. Thus, downward motion of the piston rod 30 swings the support member 25 about the pivot rod 23 and acts to lift an outboard tiller frame 32. Retraction of the piston rod 23 restores the frame 32 toward or to the horizontal position.

The support member 25 (see FIG. 3) also carries bearings 33 and 34 that support a vertical pivot rod 35 to which the tiller frame 32 is pivoted, enabling swinging movement of the tiller frame 32 in a direction normal to the vertical pivot rod 35. This latter swinging movement is brought about, as shown in FIG. 2, by a horizontally mounted double-acting hydraulic cylinder 36, one end 37 of which is secured to the stationary frame member 20. Its piston rod 38 is pivotally mounted to a bracket 39 on the tiller frame 32. Extension of the rod 38 moves the tiller frame 32 outwardly to its FIG. 2 position, while retraction of the rod 38 pulls in the tiller frame 32.

The tiller frame 32 supports a hydraulic tiller motor 40 near its outboard end 41. The motor 40 may act through conventional gearing (not shown), or may be flat and directly overlie and be connected to a direct vertical shaft, to rotate a tiller head 42 having a series of downwardly extending tines 43 (FIG.4). The depth of the cut can be controlled by the operator at all times by means of the vertical cylinder 26, by which he can lift the tiller completely out of the ground and up in the air. The operator has full view of the head 42 at all times and the cutting depth may be made positive or may be made to float, as desired.

The tiller head 42 is, normally, automatically retracted by a valve 44 (FIGS. 2 and 4-6) which is actuated by a sensor arm 45 and which then actuates the horizontal cylinder 36. The sensor arm 45, which may be made from fiberglass, normally extends out horizontally somewhat beyond the tiller head 42, and its inboard end is secured to a bracket member 46 by pillow blocks 47 and 48. A vertical rod 50, secured to the bracket 45, is pivoted to the gimbal frame 33, so that when the arm 42 swings, it rotates the rod 50. Clamped to the rod 50 is a bracket 51 to which is secured an offset vertical rod 52, so that rotation of the rod 50 causes an arcuate movement of the rod 52.

A sleeve 53 encircles the rod 52 and can rotate freely and move freely vertically relatively to it. The sleeve 53 has a cam 54 attached to one side of it. The inner face of this cam 54 is normally engaged near its lower edge by a cam-actuating member 55 which is offsetmounted on the rod 50 so that (during the automatic mode of operation) it forces the cam 54 to engage a valve actuating lever 56 of the valve 44 when the rod 52 is moved away from its normal rest position.

Thus, in normal, automatic operation, when the sensor arm 45 strikes a vine, tree trunk, grapestake, or fence post or the like, the cam 54 swings and comes against the valve-actuating lever 56 and thereby actuates the valve 44 which controls the horizontal cylinder 36, causing it to retract its rod 38 and pull the tiller head 42 in toward the tractor 14. The cam action assures retraction of a set amount, unaffected by how much the sensor arm 45 swings, and the valve 44 automatically reverses, so that the tiller frame 32 is extended again when the sensor arm 45 is restored to its normal position by a spring 57 extending between the bracket 46 and the frame 20. The cutting head 42 thus moves in and out of the plant row and does so automatically, retracting only so far as is pre-set by the valve 44 and the cam 54.

However, in some conditions completely automatic operation is less desirable, as when irrigation equipment is encountered and when the plow is moving up a hill. In this and in other conditions, it is desirable that the operator be able to override the sensor manually. Also, as when weed tend to actuate the sensor, it is desirable for the operator to disengage the automatic operation and operate entirely manually. The present invention makes both manual override and manual disengagement possible.

At its upper end, the sleeve 53 (FIGS. 4 and 7) is secured to a horizontal bracket 60 having a horizontal slot 61 therethrough. A horizontal rod 62 (FIGS. 5 and 0), normal to the bracket 60, has a short bar 63 at its end provided with an offset opening 64 from which a bolt 65 extends through the slot 61, joining the rod 62 to the bracket 60 while enabling relative vertical movements.

Hence, rotation of the rod 62 raises the sleeve 53 upwardly, about ½ inch (FIGS. 6 and 10). When the sleeve 53 rises, the cam 54 is lifted above the cam-actuating member 55, so that the position of the sensor arm 45 no longer controls the position of the cutting head 42.

The rod 62 is movable and rotatable within a horizontal sleeve 66, secured to said stationary frame 25, through which the rod 62 extends to a ball joint 67. The ball joint 67 attaches the rod 62 to a sleeve 68, which is connected (see FIGS. 2 and 4), as by a set screw 69 to a rod 70 extending through an eyelet bracket 71 supported by the tractor frame, the rod 70 having a handle 72 at its upper end. The operator can use the handle 72 to rotate the rod 62, so as to raise the sleeve 53 and can also then use it to rotate the sleeve 53 (by pulling the handle so as to translate the rod 62) so as to manually cause the cam 54 to actuate the lever 56 that actuates the valve 44—thereby causing the retraction of the tiller head 42 regardless of the position of the sensor 44—the spring 57 restoring the tiller head 42 to its normal position upon release of the handle 72 by the operator.

Another feature of the invention is the provision of a sharp cutter blade 75 (FIG. 4) suspended in a stationary position from the bottom of the tiller frame 32 near the head 42 in a position where it cuts weeds or other plant material that tend to get caught in the tines of the head 42, cutting them off so that there is no whipping of young vines by such grass stems.

FIG. 11 shows a further feature, by which the head 42 is made to float, so that upon engagement of a rock by its tines 43, the head 42 will rise rather than let the tines 43 break or bend against the rock, yet the head 42 will go back down when the rock deposit has been passed. The vertically mounted lift cylinder 26 is actuated by a control valve 80 via a line 81 to raise the head 42 and by a control valve 82 via a line 83 to force the head 42 down into the ground. A tee 84 in the line 83 is connected to a two position valve 85. When the valve 85, is in its "pressure down" position, positive pressure holds the head 42 down, for then the tee 84 is connected by a passage 86 to a dead-end plug 87. When a valve handle 88 is lifted to its "free float" position, the tee 84 is connected by a passage 89 to the fluid reservoir 90, enabling the head 42 to rise when it encounters significant obstruction.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. In a retractable tiller for installation at one side of a tractor, having a stationary frame, a tiller frame pivoted to said stationary frame for relative vertical movement and also pivoted to said stationary frame for relative horizontal movement, with power means for moving said tiller frame for both said relative vertical and said relative horizontal movement, said tiller frame carrying a tilling head at is outboard end, control means for said power means having actuating means, the combination therewith of a horizontal sensor arm, a first vertical rod secured to said sensor arm, so that when said sensor arm engages a vine trunk, tree, fence post, or grapestake, it rotates said first vertical rod about its vertical axis, yieldable spring means connecting said sensor arm to said stationary frame for urging said sensor arm to a position normal to the direction of movement of the tractor, a second vertical rod connected to said first vertical rod parallel to it and offset from it, a sleeve around said second vertical rod and slidable and rotatable relative thereto, said sleeve having thereon a cam in contact with said actuating means, a cam actuating member offset-mounted on said first vertical rod and normally in contact with a lower portion of said cam to cause said cam to bear against and actuate said actuating means when said sensor arm swings, and manual override means for moving said sleeve so as to cause said cam to actuate said actuating means regardless of the position of said sensor arm, actuation of said actuating means actuating said control means to energize said power means to retract said tiller frame toward said tractor.

2. The combination of claim 1 having manual disengagement means for raising said sleeve upwardly relatively to said second vertical rod to disengage said cam from cam actuating member, so as to place operation of said actuating means entirely under manual control.

3. The combination of claim 2 wherein said manual override means and said manual disengagement means comprise a handle mounted on a downwardly extending rod, a horizontally extending rod connected to said downwardly extending rod by a rotary joint and connected to said sleeve by connection means for converting rotary movement of said horizontally extending rod to vertical movement of said sleeve and translation of said horizontally extending rod to rotation of said sleeve, thereby to move said cam toward said actuating means.

4. The combination of claim 1
wherein said tilling head is a rotary head having a series of depending tines and a sharp cutting blade depending from said tiller frame closely adjacent to said tiller apparatus for cutting off weeds that tend to wind around said tines.

5. The combination of claim 1 wherein said power means comprises hydraulic means for holding said tilling head down in the soil at a predetermined vertical position and manually controlled valve means for, when actuated, enabling a predetermined obstacle force to push said tilling head upwardly.

6. In a retractable tiller for installation at one side of a tractor, having a stationary frame, a gimbal having a gimbal frame pivoted to said stationary frame by a stationary horizontal pivot rod and having first and second vertical pivot rods, first power means for tilting said gimbal frame about said horizontal pivot rod, a tiller frame pivoted to said first vertical pivot rod and carrying tilling apparatus, second power means for swinging said tiller frame about said first vertical pivot rod, and control means for said second power means having an actuating lever, the combination therewith of a sensor arm connected to said second vertical pivot rod and extending horizontally outwardly, so that when it engages a vine trunk, tree, fence post, or grapestake, it rotates said second vertical rod, yieldable spring means connecting said sensor arm to said stationary frame for urging said sensor arm to a position normal to the direction of movement of the tiller, a bracket secured to said second vertical rod, a third vertical rod secured to said bracket parallel to and offset from said second vertical rod, a sleeve around an upper portion of said third vertical rod and slidable and rotatable relative thereto, said sleeve having thereon a cam in contact with said actuating lever, a cam actuating member, offset-mounted on said second vertical rod and normally in contact with a lower portion of said cam to cause said cam to bear against and actuate said actuating lever when said sensor arm swings, and manual override means for moving said sleeve so as to cause said cam to actuate said actuating lever regardless of the position of said sensor arm, actuation of said actuating lever actuating said control means to energize said second power means to retract said tiller frame toward said tractor.

7. The combination of claim 6 having manual disengagement means for raising said sleeve upwardly relatively to said third vertical rod to disengage said cam from cam guiding means, so as to place operation of said actuating lever entirely under manual control.

8. The combination of claim 7 wherein said manual override means and said manual disengagement means comprise a handle mounted on a downwardly extending rod, a horizontally extending rod connected to said downwardly extending rod by a ball joint and connected to said sleeve by connection means for converting rotary movement of said horizontally extending rod to vertical movement of said sleeve and translation of said horizontally extending rod to rotation of said sleeve and movement of said cam toward said actuating lever.

9. The combination of claim 8 having a sleeve supported by said stationary frame for supporting said horizontally extending rod for free rotation and translation and a support member for supporting said downwardly extending rod near its handle for free rotation and translation.

10. The combination of claim 9 wherein said downwardly extending rod comprises a rod member having a handle, a sleeve member connected to said ball joint, and a set screw joining said rod member to said sleeve member.

11. The combination of claim 6 wherein said tilling apparatus includes a rotary head supported by said tiller frame at its distal end said head having a series of depending tines and a sharp cutting blade depending from said tiller frame closely adjacent to said tiller apparatus for cutting off weeds that tend to wind around said tines.

12. The combination of claim 6 wherein said first power means comprises hydraulic means for holding said tilling apparatus down in the soil at a predetermined vertical position and manually controlled valve means for, when actuated, enabling a predetermined obstacle force to push said tilling apparatus upwardly.

13. In a retractable tiller for installation at one side of a tractor, having a stationary frame, a tiller frame pivoted to said stationary frame via a stationary horizontal pivot, and power means for moving said tiller frame up and down about said horizontal pivot, a tilling head at the outboard end of said tiller frame, said tilling head having a plurality of tines in a rotary assembly the combination therewith wherein said power means comprises hydraulic means for holding the tines of said tilling head down in the soil at a predetermined vertical position, comprising an hydraulic circuit with a tee valve set to maintain downward pressure on said head, and manually controlled valve means for, when actuated, moving said valve so that resistance to pressure returns hydraulic fluid to a reservoir, thereby enabling a predetermined obstacle force to push said tilling head and frame upwardly.

* * * * *